United States Patent [19]

Vanka et al.

[11] Patent Number: 5,479,636
[45] Date of Patent: Dec. 26, 1995

[54] CONCURRENT CACHE LINE REPLACEMENT METHOD AND APPARATUS IN MICROPROCESSOR SYSTEM WITH WRITE-BACK CACHE MEMORY

[75] Inventors: Subbarao Vanka, Portland, Oreg.; Prasanna Rupasinghe, Sacramento; Mark Lalich, Orangevale, both of Calif.

[73] Assignee: Intel Corporation, Santa Clara, Calif.

[21] Appl. No.: 400,116

[22] Filed: Mar. 6, 1995

Related U.S. Application Data

[63] Continuation of Ser. No. 977,226, Nov. 16, 1992, abandoned.

[51] Int. Cl.$^6$ ................................................. G06F 12/12
[52] U.S. Cl. .................................... 395/460; 395/470
[58] Field of Search ................................. 395/400, 425; 364/200, 900, DIG. 1, DIG. 2

[56] References Cited

U.S. PATENT DOCUMENTS

| | | | |
|---|---|---|---|
| 4,995,041 | 2/1991 | Hetherington et al. | 371/40.1 |
| 5,034,885 | 7/1991 | Matoba et al. | 395/425 |
| 5,197,144 | 3/1993 | Edenfield et al. | 395/425 |
| 5,228,134 | 7/1993 | MacWilliams et al. | 395/425 |
| 5,253,358 | 10/1993 | Thoma, III et al. | 395/500 |
| 5,295,259 | 3/1994 | Horne | 395/575 |
| 5,313,609 | 5/1994 | Baylor et al. | 395/425 |

*Primary Examiner*—Jack A. Lane
*Attorney, Agent, or Firm*—Blakely, Sokoloff, Taylor & Zafman

[57] ABSTRACT

A concurrent cache line replacement method and apparatus for a high performance microprocessor system with a write-back cache memory is disclosed. The invention is advantageously utilized in a microprocessor system comprising a CPU, a write back cache memory, DRAM main memory, a cache and DRAM controller (CDC), and a data path unit (DPU) with a write buffer capability. In accordance with the method of operation of the present invention, when a read access by the CPU results in a cache miss to a dirty cache line, the CDC concurrently initiates two operations. The CDC initiates the writing of the dirty line in the cache memory to a write buffer in the DPU, while concurrently, the CDC also initiates the reading of the new line from the DRAM main memory. With respect to the writing of the old line from cache memory to the write buffer in the DPU, at some time subsequent to the initiation of this operation, the CDC completes the writing of the old line to the DPU and internally notes this completion, and at a later point in time, the CDC is able to transfer of the old line from the write buffer in DPU to the DRAM. With respect to the reading of the new line from the DRAM main memory, initiated concurrently with the preceding write operation, this read operation overlaps in time with the single restriction that the CDC not cause the new line to actually be written to the cache memory until the writing of the old line to the write buffer in the DPU is completed. Alternatively, the restriction can be tailored to apply at the d-word level.

11 Claims, 6 Drawing Sheets

CONCURRENT CACHE LINE REPLACEMENT METHOD AND APPARATUS IN MICROPROCESSOR SYSTEM WITH WRITE-BACK CACHE MEMORY

This is a continuation of application Ser. No. 07/977,226, filed Nov. 16, 1992, now abandoned.

BACKGROUND OF THE INVENTION

1. Field of the Invention

The present invention relates to microprocessor systems, and more particularly, to a concurrent cache line replacement method and apparatus for a high performance microprocessor system with a write-back cache memory.

2. Related Applications

This application is related to copending U.S. patent application Ser. No. 07/976,891, filed Nov. 16, 1992, entitled, "Zero Wait State Level 2 Cache Memory Using Non-Interleaved Banks of Asynchronous SRAMs," copending U.S. patent application Ser. No. 07/977,228, filed Nov. 16, 1992, entitled, "Pseudo-Concurrent Access to a Cached Shared Resource," and copending U.S. patent application Ser. No. 07/977,232, filed Nov. 16, 1992, entitled, "Dynamic Cache Coherency Method and Apparatus."

3. Art Background

In order to avoid frequent, cycle consuming accesses of main memory, a microprocessor system frequently utilizes cache memory. A cache memory is typically comprised of a relatively small amount of static random access memory (SRAM) which is both physically faster than main memory and arranged such that it can be addressed more rapidly than main memory. The cache memory is then disposed between the microprocessor and the main memory and used to capture and store instructions and data as they are used by the microprocessor. Once these instructions and data are present in the cache memory, the microprocessor can, thereafter, quickly and advantageously access them in the cache memory rather than in main memory. The intelligent design and management of a cache memory can substantially enhance the performance of the overall microprocessor system.

One of the problems associated with the use of a cache memory in a micoprocessor system, however, is the problem of cache coherency. In particular, when a block of data is first placed in the cache memory from main memory the block of data constitutes an exact copy of the block of data as stored in main memory. If the microprocessor, however, later modifies this block of data in cache memory, for example, through a write operation, and fails to similarly modify the corresponding block of data in main memory, the two blocks of data become inconsistent or incoherent. Under such circumstances, the main memory will continue to store what is now a "stale" block of data, while the cache memory stores the proper "updated" block of data. If an I/O unit or an additional, associated microprocessor thereafter accesses the block of data in main memory, it improperly accesses a stale block of data. For this reason, as well as others appreciated by those skilled in the art, cache coherency must be maintained in a microprocessor system.

Two basic solutions to the problem of cache coherency have been devised. The first solution utilizes what is termed "a write through cache." In a write through cache, coherency is maintained by insuring that whenever a write operation to a block of data in cache memory occurs, a similar write operation is also performed on the corresponding block of data residing in main memory. While this approach effectively guarantees coherency, it also exacts a heavy performance price, as the length of each and every write operation is determined not by the relatively fast time it takes to write to cache memory, but instead, by the relatively slow amount of time it takes to write to main memory.

A second solution which offers higher performance by not exacting as much processor overhead utilizes what is termed "a write back cache." In a write back cache, a write operation to a block of data in cache memory is not immediately accompanied with a similar write operation to the corresponding block of data residing in main memory. Instead, cache coherency is maintained through the use of subsequent and selective write back operations from the cache memory to the main memory. Such write back operations can be made selectively whenever they are required to maintain cache coherency.

One common context in which a write back cache necessarily utilizes a write back occurs in a write back cache when a processor read access results in a cache miss to a modified or "dirty" cache line such that in order to avoid an overwriting of the older, dirty cache line, a write back of the dirty cache line to main memory must occur. In such a scenario, in prior art systems, two separate operations were performed in serial fashion. First, the older, dirty cache line was written to main memory. Second, and serially, the new cache line was written from main memory to the former location of the older, dirty cache line. Such prior art replacement approaches, however, adversely required the processor to wait or stall for the whole duration of the serial replacement operation, resulting in the waste of valuable processor time. As will be described, the present invention provides for a concurrent cache line replacement method and apparatus which advantageously minimizes processor overhead.

SUMMARY OF THE INVENTION

The present invention finds application in the area of microprocessor systems, and more particularly, to a concurrent cache line replacement method and apparatus. The present invention is advantageously utilized in a microprocessor system comprising a CPU, a write back cache memory, DRAM main memory, a cache and DRAM controller (CDC), and a data path unit (DPU) with a write buffer.

In accordance with the method of operation of the present invention, when a read access by the CPU results in a cache miss to a dirty cache line (hereinafter referred to as the old line), the CDC concurrently initiates two operations. The CDC initiates the writing of the old line in the cache memory to a write buffer in the DPU, while concurrently, the CDC also initiates the reading of the new line from the DRAM main memory. With respect to the writing of the old line from cache memory to the write buffer in the DPU, at some time subsequent to the initiation of this operation, the CDC completes the writing of the old line to the DPU, and internally notes this completion. At a later point in time, the CDC is able to transfer the old line from the write buffer in DPU to the DRAM without incurring any CPU overhead. With respect to the reading of the new line from the DRAM main memory initiated concurrently with the preceding write operation, this read operation overlaps in time with the preceding write operation with the single restriction that the CDC not cause the new line to actually be written to the cache memory until the writing of the old line to the write buffer in the DPU is completed.

Thus, the present invention does not initiate and complete a write operation of an old cache line to main memory, then, in serial fashion, initiate and complete a read of the new line from main memory and write this new line to a CPU and a cache. Instead, the present invention, to the maximum extent possible, seeks to overlap these operations such that valuable processor cycles are not wasted waiting for the new cache line.

BRIEF DESCRIPTION OF THE DRAWINGS

Further details are explained below with the help of the examples illustrated in the attached drawings in which.

DETAILED DESCRIPTION OF THE INVENTION

A concurrent cache line replacement method for a high performance microprocessor system with a write-back cache memory is described. In the following description, for purposes of explanation, numerous details are set forth in order to provide a thorough understanding of the present invention. However, it will be apparent to one skilled in the art that such specific details are not essential to the practice of the present invention. In other instances, in a number of figures, well known electrical structures and circuits are shown in block diagram form in order not to obscure the present invention unnecessarily.

Figure 1:
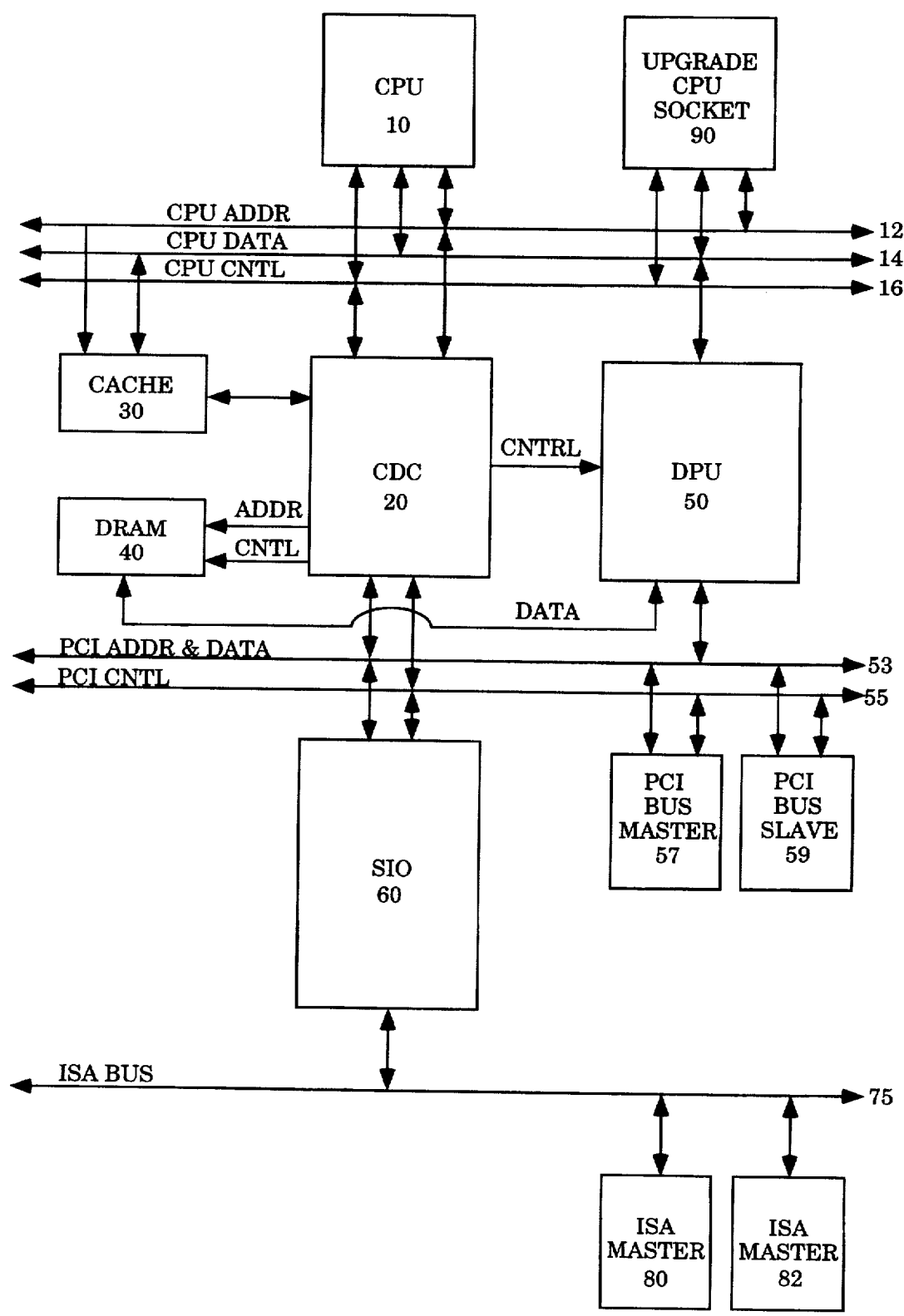
FIG. 1 illustrates a microprocessor system in which the present invention can advantageously be utilized.

Referring now to FIG. 1, this figure illustrates, in block diagram form, a microprocessor system in which the present invention can be advantageously utilized. The microprocessor system includes a microprocessor (CPU) 10, a CPU address bus 12, a CPU data bus 14, a CPU control bus 16, a cache memory 30, main memory (DRAM) 40, a cache and DRAM controller (CDC) 20, a data path unit (DPU) 50, a peripheral component interconnect (PCI) address and data bus 53, a peripheral component interconnect (PCI) control bus 55, both buses shown with a bus master 57 and a bus slave 59, a system I/O component (SIO) 60, an ISA bus 75 shown with ISA slaves 80 and 82, and a CPU upgrade socket 90. As shown in this figure, the CPU 10 is coupled to the CPU address bus 12 such that it can transfer access addresses over this bus, the data bus 14 such that it can transfer data over this bus, and the control bus 16 such that it can transfer control signals over this bus.

The cache memory 30 is advantageously comprised of static random access memory (SRAM) and is an external, second level write back cache for the CPU 10. (The first level cache, not shown, is disposed within the CPU chip 10). The cache memory 30 can, for example, comprise a one or two bank, direct mapped, non-interleaved cache memory implemented using standard asynchronous SRAMs. The microprocessor system can accommodate cache memory sizes ranging from 64 KB to 512 KB, with a line size of 16 Bytes (4 d-words), and a tag size of 7 or 8 bits. As shown, cache memory 30 is coupled to the CPU data bus 14 such that it can receive data from, and provide data to, the CPU 10. Continuing to refer to FIG. 1, the main memory (DRAM) 40 is comprised of dynamic random access memory (DRAM), which might, for example, range in size from 2 MBytes to 128 MBytes. The DRAM 40 can be implemented in either a discrete device or single in line memory modules (SIMMs).

The PCI address and data bus 53, and PCI control bus 55, are buses which together, provide for a physical interconnection mechanism for use between integrated peripheral controller components and processor/memory systems. In particular, peripheral I/O components such as disk drive controllers, network controllers and graphics controllers can be coupled to such a peripheral bus. Two such peripheral I/O components, denoted PCI bus master 57 and PCI bus slave 59, are shown in FIG. 1 coupled to the PCI address and data bus 53, and the PCI control bus 55. A specific peripheral component interconnect bus which is advantageously utilized in connection with the present invention is described in a related, copending U.S. patent application Ser. No. 07/876,577, filed, Apr. 30, 1992, entitled "A Signaling Protocol for a Peripheral Component Interconnect." Such a bus is characterized by a rich mix of I/O capabilities such that several peripheral components can be coupled to the bus and perform their functions relatively autonomously, in a fashion similar to, for example, the CPU 10 performing its functions on its associated CPU buses. A system I/O (SIO) component 60 serves as a bridge from the PCI buses 53 and 55 to an ISA bus 75. The SIO component 60 integrates an ISA compatible DMA controller, timer/counter and interrupt controller, as well as PCI bus arbitration logic (not shown in this figure).

Continuing to refer to FIG. 1, the data path unit (DPU) 50 is a three port ASIC comprised of data buffers and associated control logic. The DPU 50 is coupled through a first port to the CPU data bus 14 such that it can receive data from, and provide data to, the CPU 10. Through a second port, the DPU 50 is coupled to main memory (DRAM) 40 such that it can provide data to, and receive data from DRAM 40. And through a third port, the DPU 50 is coupled to the PCI address and data bus 53. Disposed within the microprocessor system in this manner, the DPU 50 is advantageously utilized to route data from the CPU data bus 14 to the PCI address and data bus 53, the CPU data bus 14 to DRAM 40, and the PCI address and data bus 53 to DRAM 40. In order to facilitate these and other functions, in a first embodiment, the DPU 50 incorporates two sets of write buffers. A first set of write buffers is 4 d-words deep (16 bytes) and is associated with transfers between the CPU 10 and the DRAM 40, while a second set of write buffers also 4 d-words deep is associated with transfers between the CPU 10 and the PCI buses.

The cache and DRAM controller (CDC) 20 controls accesses to cache memory 30 and DRAM 40. CDC 20 is comprised of buffers, a plurality of control logic blocks, and configuration registers used to specify: PCI bus configurations, DRAM configurations, cache configurations, operating parameters, and optional system features (not shown in this figure). In operation, the CDC 20 effectively interfaces DRAM 40 to the CPU buses as well as the PCI buses. Through the use of cache controller logic, it additionally controls accesses to cache memory 30, and through the use of DPU controller logic, CDC 20 further manages the buffering of data within the DPU 50.

Figure 2:
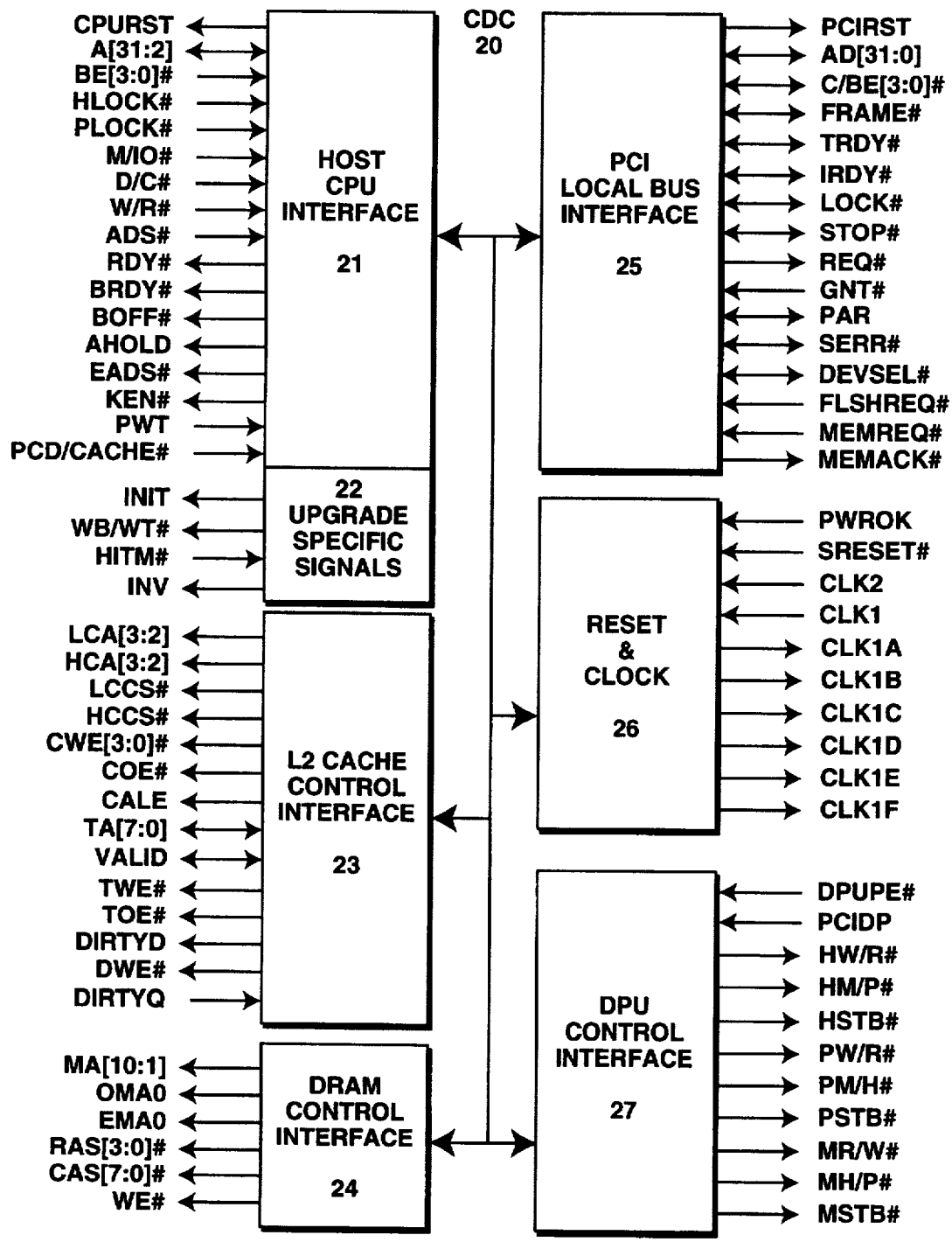
FIG. 2 illustrates, in block diagram form, the logic blocks of the cache and DRAM controller.

With reference now to FIG. 2, this figure illustrates, in block diagram form, the functional logic blocks of the CDC 20, as well as the control signal inputs and outputs associated with each of these functional logic blocks. Reserving a description of the control signal inputs and outputs relevant to the present invention for later, while referring both to FIGS. 1 and 2, the logic blocks in CDC 20 include: a host CPU interface 21 which interfaces CDC 20 with CPU 10 and an upgrade specific signals block 22 which generates particular signals in the event a CPU upgrade is incorporated into the CPU upgrade socket 90 shown in FIG. 1. CDC 20 further incorporates an L2 Cache control interface 23 which interfaces CDC 20 with cache memory 30 thereby serving to manage accesses to cache memory 30. DRAM control interface 24 interfaces CDC 20 with DRAM 40, serving to control accesses to DRAM memory 40, while DPU control interface 27 interfaces CDC 20 to DPU 50 and manages the buffering of data within DPU 50. The PCI local bus interface 25 interfaces CDC 20 to the PCI buses 53 and 55, while the reset and clock block 26 contains the central clock generation logic for the microprocessor system.

Figure 3:
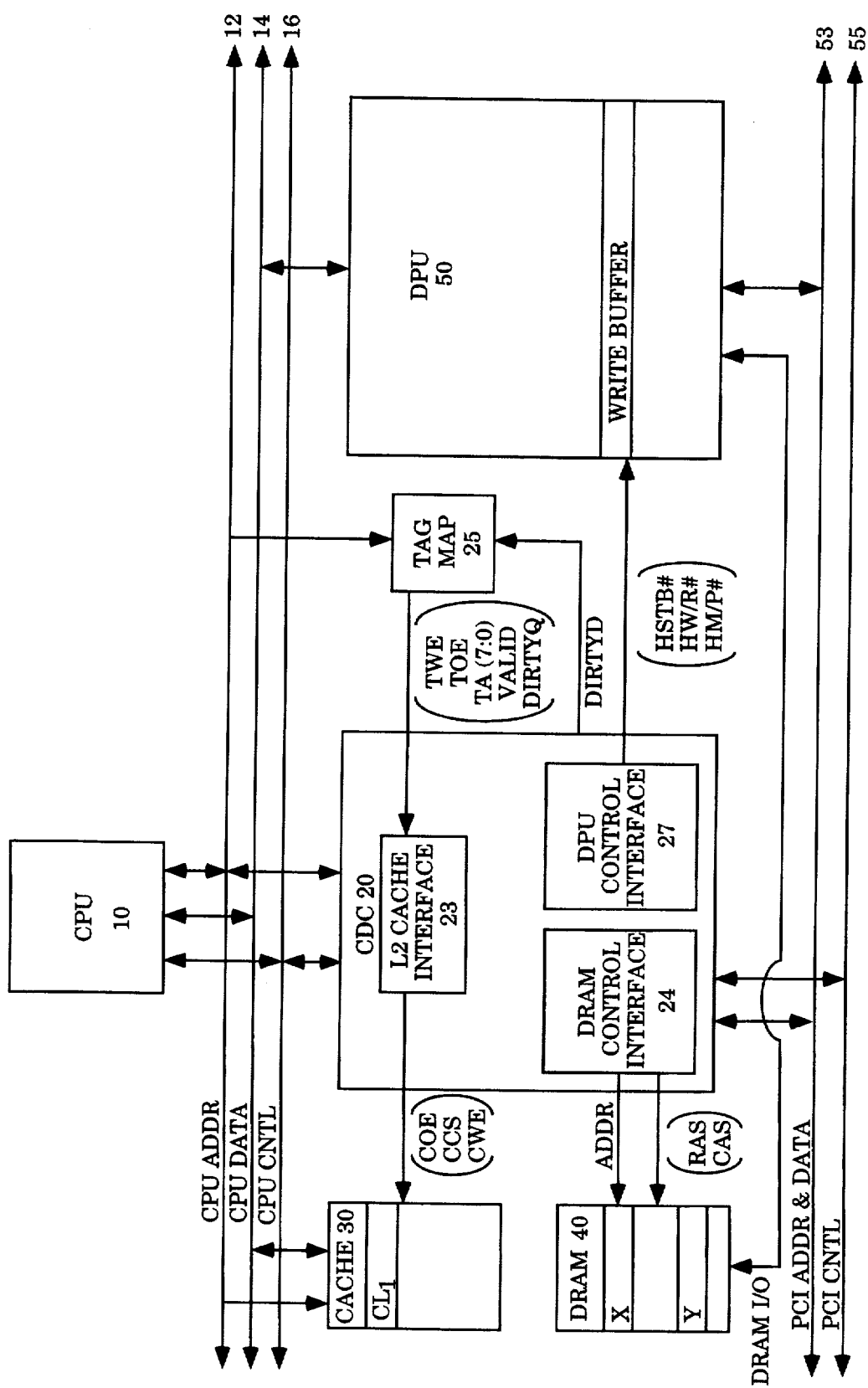
FIG. 3 particularly illustrates the components of the microprocessor system and control signals utilized in the present invention.

Referring now to FIG. 3, this figure illustrates the components shown in the preceding figures which are particularly utilized to accomplish the concurrent cache line replacement method of the present invention. Additional elements shown in this figure include a tag map circuit 25 which receives addresses from the CPU address bus 12, and responsively translates these addresses such that the CDC 20 and in particular, the L2 cache interface block can determine whether a cache hit or miss has occurred. Control signals are provided from the tag map circuit 25 to the CDC 20 as well as from the CDC 20 to the tag map circuit 25. Also shown in this figure, in simplified form, is a write buffer within the DPU 50 which is advantageously utilized in the method of operation of the present invention. As previously described, cache memory 30 is utilized in the illustrated system as a write back cache.

It will be appreciated by those skilled in the art that a write back cache such as cache memory 30 can be mapped to main memory in a number of ways. For example, the cache can be mapped to main memory in accordance with a direct mapped scheme, or alternatively, it could be mapped using a set associative scheme. For illustrative purposes, the description which follows will assume that cache memory 30 is direct mapped; however, the present invention is no way limited to this particular mapping scheme. In particular, the present invention is equally well suited to application in a system in which the cache memory is mapped using set associative mapping, one which might, for example, use a least recently used (LRU) algorithm to determine which cache line should be written back to main memory.

Figure 4:
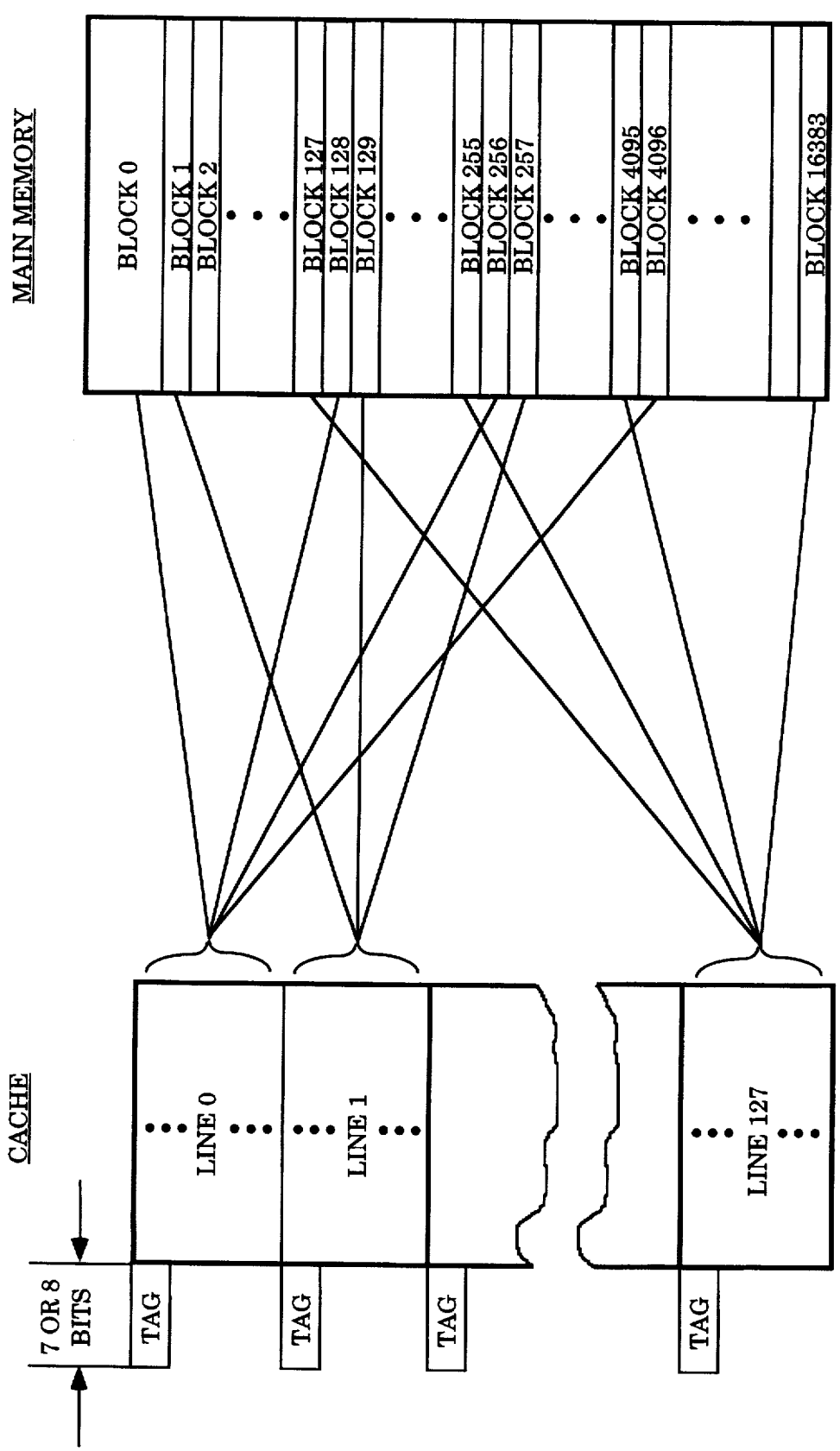
FIG. 4 illustrates a simple example of a direct mapped cache wherein particular cache block lines are mapped directly to particular blocks of data in main memory.

Referring briefly to FIG. 4, this figure illustrates, in a simplified form, an example of a direct mapped cache wherein particular cache block lines are mapped directly to particular blocks of data in a main memory. This figure illustrates the basic placement policies behind a direct mapped cache, and beyond this pedagogical purpose, should not be taken in any way as a limitation upon the present invention. In the direct mapped cache shown in FIG. 4, the cache memory is of a size 2K, with 16 words per cache line. Thus, the cache has 128 cache lines. The main memory shown has a capacity of 256K words, or 16,384 blocks, with a physical address representable in 18 bits. In accordance with a direct mapping policy, a block x of the main memory will map into one of the 128 cache lines of the cache memory. Thus, as shown in this figure, several blocks of data from main memory will necessarily map to the same particular cache line in the cache memory. Of all the main memory blocks of data that map into a single cache line in the cache memory, it will be appreciated that only one can actually reside in the cache at one time.

Returning now to FIG. 3, it will be appreciated that in the event that both line X and line Y in DRAM 40 map to the same cache line CL1 in cache memory 30, and the CPU 10 requests a read of line Y when CL1 presently contains a modified or "dirty" version of line X, a replacement operation must take place. In particular, the old, dirty line X in the cache memory 30 must be written back to DRAM 40, and a new line Y must be written to both the CPU 10 and the cache memory 30, in particular, into cache line CL1. As will be described in accordance with the present invention, such a replacement operation is accomplished through the use of a maximally concurrent cache line replacement operation.

Figure 5:
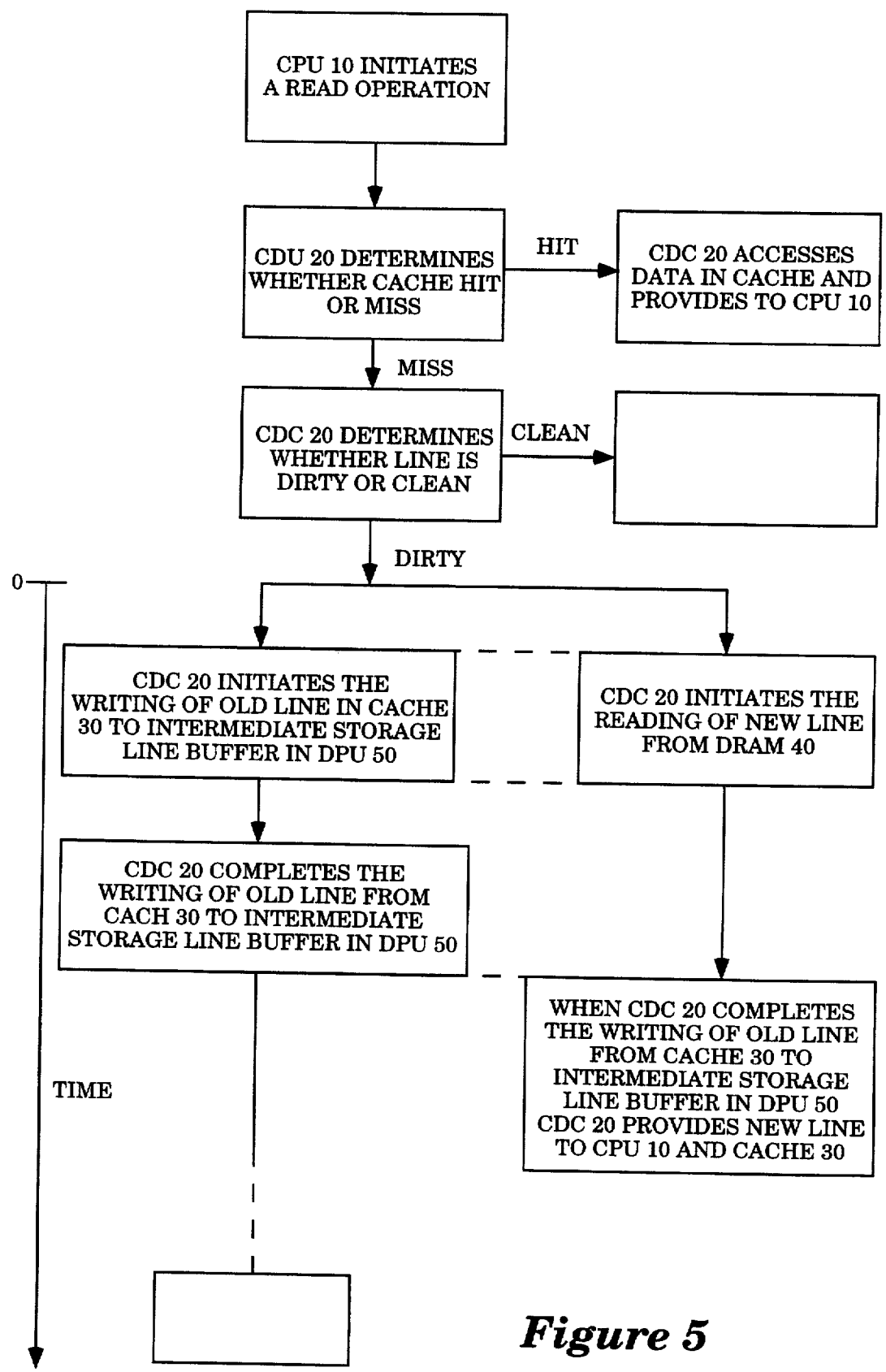
FIG. 5 illustrates, in flow chart form, the concurrent cache line replacement method of the present invention.

Referring to FIG. 5, this figure illustrates, in flow chart form, the method of operation of the present invention. With reference now to FIGS. 3 and 5, the method of operation of the present invention will be described. The CPU 10 initiates a read operation to a particular address. This address is coupled over the CPU address bus 12 to both the tag map circuit 25 and the CDC 20. Based upon signals provided by the tag map circuit 25, the CDC 20, and in particular, the L2 cache interface in the CDC 20, determines whether a cache hit or miss has occurred. In the event a cache hit occurs, the CDC 20 simply accesses the cache line and provides it to the CPU 10 over the CPU data bus 14. In the event a cache miss has occurred, the CDC 20 also determines whether the particular cache line contains modified data, i.e. is "dirty" or "clean." If there is a cache miss and the cache line is clean, the CDC 20 accesses the requested data in DRAM 40 and the data is written from the DRAM 40, through the DPU 50, over the CPU data bus 14 to both cache memory 30 and the CPU 10. These initial steps and determinations are summarized in the first few blocks shown in FIG. 5.

In the event that the read access initiated by CPU 10 results in both a cache miss and an indication that the existing cache line has been modified, i.e. is dirty, in accordance with the present invention, the CDC 20 simultaneously initiates two operations. The CDC 20 initiates the writing of the old line in the cache memory 30 to a write buffer in the DPU 50, while concurrently, the CDC 20 also initiates the reading of the new line from DRAM 40. The concurrence of these two steps is indicated in FIG. 5 through the use of a line, and the term "concurrently" connecting these two steps.

Focusing first upon the writing of the old line from cache memory 30 to the write buffer in DPU 50, at a time subsequent to the initiation of this operation, the CDC 20 completes this operation, and the CDC 20 internally notes this completion. With reference to FIG. 3, the CDC 20 causes this write operation to proceed through the use of control signals coupled from the L2 cache interface 23 to the cache memory 30, and through the use of control signals coupled from the DPU control interface 27 to the DPU 50. In particular, the CDC 20 causes the old line to be coupled from the cache 30, over the CPU data bus 14, to a write buffer in DPU 50. Referring now to both FIGS. 3 and 5, at a subsequent time to this completion, the CDC 20 causes the transfer of the old line from the write buffer in DPU 50 to the DRAM 40 without incurring any processor overhead.

Focusing now upon the reading of the new line from DRAM 40, it will be recalled, as shown in FIG. 5 that the CDC 20 initiated the reading of the new line from DRAM 40 concurrently with the initiation of the writing of the old line from cache memory 30 to DPU 50. It will be appreciated that the reading of the new line from DRAM 40 is made with the ultimate goal of providing this new line to the CPU 10, and also writing this new line in the former location of the old line in cache memory 30. Following the initiation of this process, then, CDC 20 proceeds with the reading of the new line from the DRAM 40 such that through the DRAM control interface 24 it provides the required control signals to DRAM 40. It will be appreciated that proceeding with the read access of DRAM 40 initially entails the coupling of the address and appropriate control signals to the DRAM 40. In response, the DRAM 40 determines whether a page hit or miss has occurred, a process which necessarily involves the consumption of some clock cycles. In the case of a page miss, for example, 6–8 clock cycles might be consumed by the DRAM 40. In accordance with the present invention, these post-DRAM read initiation clock cycles are advantageously overlapped in time with the writing of the old line from cache 30 to DPU 50.

The read of the new line from DRAM 40 proceeds with effectively a single restriction, namely, that the CDC 20 cannot cause the new line to actually be written to the cache memory 30, until the writing of the old line to the write buffer in the DPU 50 is completed. In the simple case, if at the point in time that the new line is available on the DRAM I/O of DRAM 40, the writing of the old line into the write buffer in DPU 50 has completed, the CDC 20 simply proceeds to write the new line from the DRAM 40 into cache memory 30 and provides the new line to CPU 10. In the system shown in FIG. 3, this entails the CDC 20 issuing control signals which cause the new line to be written from the DRAM 40, through the DPU 50, and over the CPU data bus 14 to the cache memory 30 and the CPU 10.

If, on the other hand, the writing of the old line from the cache memory 30 into the write buffer in DPU 50 has not completed at the time the new line is available from DRAM 40 the CDC 20 waits until this has been completed. If the CDC 20 were not to wait, it would improperly overwrite portions of the old line before the old line could be saved. Under such circumstances, therefore, the CDC 20 simply waits until this writing of the old line into DPU 50 is completed, then immediately causes the new line to be written into the cache memory 30 and provided to the CPU 10 as described above.

Such an early availability of data from DRAM 40 could correspond to, for example, an immediate page hit in the DRAM 40. Under such circumstances, the CDC 20 would simply cause the first D-word to be placed on the DRAM I/O, then wait until the completion of the writing of the old line into the write buffer in DPU 50 before proceeding to the actual transfer of the new line into the cache memory 30. The possibility that the CDC 20 may need to wait for the completion of the writing of the old line into the write buffer in DPU 50 is reflected in FIG. 5 with the restrictive question: is writing of old line into write buffer in DPU complete? The CDC 20 does not proceed to write the new line into cache memory 30 until this is answered in the affirmative.

In accordance with an alternative embodiment of the present invention, the preceding method of operation can be modified such that the restriction is no longer determined by the question: is writing of old line into write buffer in DPU complete? Instead, the restriction corresponds to the question: is writing of first d-word from old line into write buffer in DPU complete? In other words, rather than restrict on a cache line basis, the method would break the overwrite issue down to the sub-cache line level, namely, the level of individual d-words. Assuming this question is answered in the affirmative, the CDC would then cause only the first d-word from the new line to be written from the DRAM to the cache memory and the CPU. This would then be followed with the CDC causing the second d-word from the old line to be written into the write buffer in the DPU, which would then be followed with the CDC causing the second d-word from the new line to be written from the DRAM to the cache memory and the CPU until the entire operation is complete. In accordance with this method of operation then, the posting and filling operations would effectively be interleaved.

It will thus be appreciated from the foregoing description that the present invention does not initiate and complete a write operation of an old cache line to main memory, then in serial fashion, initiate and complete a read of the new line from main memory and write this new line to a CPU and a cache. Instead, the present invention, to the maximum extent possible, seeks to overlap these operations such that valuable processor cycles are not wasted waiting for the new cache line.

Figure 6:
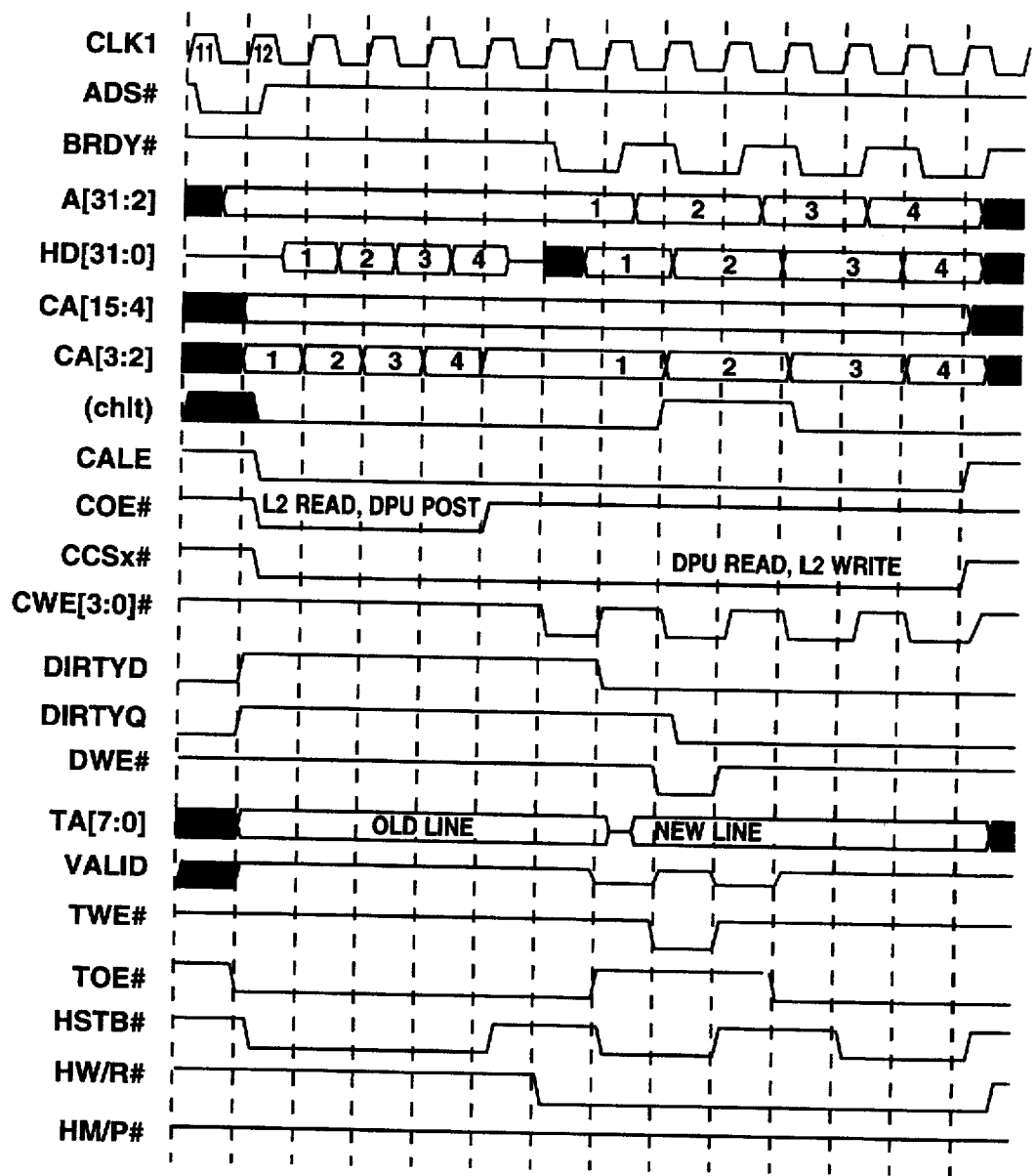
FIG. 6 is a timing diagram further illustrating the control signals utilized in the concurrent cache line replacement method of the present invention.

Referring now to the timing diagram of FIG. 6, this figure illustrates the timing of the preceding method of operation. With respect to the signals shown on this figure, the symbol "#" at the end of a particular signal name indicates that the active or asserted state occurs when the signals is at a low voltage level, while signals which do not have a "#" present after the signal name are asserted at a high voltage level. Referring now to FIG. 6 in view of the apparatus shown in FIG. 3, the CPU 10 initially couples an address status control signal (ADS#) to the CDC 20 over the CPU control bus 16. This control signal indicates that a valid bus cycle definition, byte enables and addresses are available to the CDC 20. The read address is then provided to the CDC 20 over the address lines (A[31:2]) of the address bus 12. The CDC 20 detects a cache miss which is reflected in the timing diagram of FIG. 6 with the CDC 20 internal signal denoted as "chit." The control signal DIRTYQ is also coupled to the CDC 20 from the tag map 25 which indicates that a hit to a modified cache line has occurred. The old cache line is then immediately driven over the data lines [HD (31:0)] of the CPU data bus 14. As previously described, the reading of the new line from DRAM 40 is concurrently initiated through the coupling of appropriate address and control signals to the DRAM 40 (not shown in FIG. 6).

Continuing to refer to FIGS. 3 and 6, first, second, third, and fourth d-words of the old cache line are initially shown being driven over the data lines (HD 31:0). The CDC 20 causes this cache line to be captured by the DPU 50 through the use of the control signals (HW/R#) and (HSTB#) coupled to DPU 50 which takes the data over the CPU data bus 14. With reference to the data lines (HD 31:0), it can be seen that following the transfer of the old cache line, the transfer of the new line over the data lines (HD 31:0) begins. It will be appreciated that the foregoing timing will insure that the CPU 10 is provided with the first d-word of the new line on the first cycle subsequent to the requisite transfer of the old line into the DPU 50, thereby minimizing the stalling of the CPU 10.

Continuing to refer to FIG. 6, some of the other signals shown in this figure include: the burst ready signal (BRDY#) which indicates that the system has presented valid data in response to a read, or that the system has accepted data in response to a write; the cache address signals CA[15:4] and CA[3:2] which generate the burst sequences required by the CPU 10 during secondary cache accesses; the cache address latch enable which provides the proper control timing to latches that create a cache address bus CA[18:4] from the host CPU address bus A[18:4]; the HCCS# signal and LCCS # indicate which cache data bank is selected for the current cache operation (Selected secondary cache size defines the address range in which these signals are driven active).

Additional signals shown in this figure include: the cache write enable (CWE[3:0]#) which provides byte wide write capability to the cache during cache line fills or cache write hits; the cache output enable signal (COE#) which is used to perform read cycles from the cache data SRAMs; the tag write enable signal (TWE#) which is connected to a tag map write enable (WE#) pin wherein the TWE# signal is active during CPU read-miss cycles when the cache is updated; the tag output enable signal (TOE#) which controls the output enable pin of the tag map such that when active, tag address and valid bits are driven into the CDC and wherein this signal is normally active, and driven inactive only during tag update. The VALID signal indicates the validity of data in the cache on a line by line basis. VALID is used along with the tag addresses to make the cache hit/miss decision by the CDC. If sampled low during a CPU memory read cycle, data is not valid in the cache. During an invalidate cycle, the VALID signal is forced low indicating data is not valid. The DIRTY D signal indicates whether the data in the cache is being marked as modified. The dirty bit write enable output signal (DWE#) goes active when the CPU does a WRITE cycle to the secondary write-back cache. The tag address signals TA[7:0] are directly connected to the tag SRAM data bus.

While the present invention has been particularly described with reference to FIGS. 1 through 6, it should be understood that these figures are for illustration only and should not be taken as limitations upon the invention. It is further contemplated that many changes and modifications may be made to the invention, by one of ordinary skill in the art, without departing from the spirit and scope of the invention as disclosed herein.

We claim:

1. In a microprocessor system comprising a CPU, a cache memory coupled to said CPU having cache line locations associated with addresses in said microprocessor system, a main memory, and a write buffer coupled to said main memory a concurrent cache line replacement method comprising the steps of:

(a) initiating a read access to a first address in said microprocessor system;

(b) in the event of first predesignated conditions, initiating writing of a first d-word from a first d-word location in a cache line in said cache memory to said write buffer, and simultaneously initiating reading of a second d-word from said main memory, wherein said cache line stores a plurality of d-words;

(c) writing said second d-word into said first d-word location in said cache memory and to said CPU upon completion of writing said first d-word to the write buffer;

(d) upon completion of writing said second d-word, initiating writing a next d-word of the plurality of d-words stored in the cache line at a next d-word location to said write buffer and simultaneously initiating reading of a next d-word from the main memory;

(e) writing said next d-word read from main memory into said next d-word location in said cache memory and to said CPU upon completion of writing said next d-word to the write buffer;

(f) repeating steps (d) and (e) until the plurality of d-words stored in the cache line are written to the write buffer and a plurality of d-words are read from main memory and stored in the cache line; and writing the plurality of d-words from said write buffer to said main memory.

2. The concurrent cache line replacement method as provided in claim 1, wherein said first predesignated conditions include said read access resulting in a cache miss and said first cache line of data being dirty.

3. A microprocessor system comprising:

a CPU;

a main memory;

a cache memory coupled to said CPU, said cache memory including a plurality of cache lines associated with addresses in said microprocessor system, and each cache line storing a plurality of data;

a data path unit coupled to said CPU, and said main memory, said data path unit comprising a write buffer;

a cache and main memory controller (CDC) coupled to said CPU, said cache memory, said main memory, and said data path unit, for controlling the operation of said cache memory and transfers of data from said CPU to said main memory and said cache memory, as well as, from said write buffer to said main memory, wherein said CDC, responsive to first predesignated conditions, simultaneously initiates writing of a first data of the plurality of data stored in a first cache line in said cache memory to said write buffer, and initiates reading of a second data from said main memory, such that, said first data is written from said first cache line to said write buffer, said second data is written into said first cache line at the location of the first data and to said CPU once the first data is written to the write buffer, said CDC continues to initiate writing of a next data from the cache line and simultaneously initiate reading of a next data from the main memory and once the next data is written to the write buffer writes the next data read to the cache line until the plurality of data stored in the first cache line is written to the write buffer and a plurality of data is read from main memory and written to the first cache line and said plurality of data are written from said write buffer to said main memory.

4. The microprocessor system as provided in claim 3, wherein said first predesignated conditions include said CPU initiating a read access resulting in a cache miss, and said first cache line is a dirty line, 5. In a microprocessor system comprising a CPU, a cache memory coupled to said CPU, said cache memory including a plurality of cache lines associated with addresses in said microprocessor system, each cache line storing a plurality of data, and a DRAM, a concurrent cache line replacement apparatus comprising:

data path unit (DPU) coupled to said CPU, and said DRAM, said DPU comprising a write buffer; and a cache and DRAM controller (CDC) coupled to said CPU, said cache memory, said DRAM, and said DPU, for controlling the operation of said cache memory and transfers of data from said CPU to said DRAM and said cache memory, as well as, from said DPU to said DRAM, wherein said CDC, responsive to first predesignated conditions, simultaneously initiates writing of a first data of the plurality of data stored in a first cache line in said cache memory to said write buffer, and initiates reading of a second data from said DRAM, such that said first data is written from said first cache line to said write buffer, said second data is written into said first cache line in said cache memory at the location of the first data and to said CPU once the first data is written to the write buffer, said CDC continues to initiate writing of a next data from the cache line and simultaneously initiate reading of a next data from the DRAM and once the next data is written to the write buffer writes the next data read to the cache line until the plurality of data stored in the first cache line is written to the write buffer and a plurality of data is read from DRAM and written to the first cache line, and the plurality of data are written from said write buffer to said DRAM.

6. The concurrent cache line replacement apparatus as provided in claim 5, wherein said first predesignated conditions include said CPU initiating a read access resulting in a cache miss, and said first cache line is a dirty line.

7. A cache and DRAM controller (CDC) for a system which includes a CPU, a cache memory including cache lines, each cache line storing a plurality of data, a write buffer and DRAM, comprising:

means for controlling transfers of data from said CPU to said DRAM and said cache memory, as well as, from said write buffer to said DRAM;

means for controlling said cache memory including means, responsive to first predesignated conditions, for simultaneously initiating writing of a first data of the plurality of data stored in a first cache line in said cache memory to said write buffer, and initiating reading of a second data from said DRAM, such that said first data is written from said first cache line at the location of the first data to said write buffer, said second data is written into said first cache line and to said CPU, said means for controlling continues to initiate writing of a next data of the plurality of data from the cache line and simultaneously initiate reading of a next data from the DRAM and once the next data of the plurality of data from the cache line is written to the write buffer writes the next data read to the cache line until the plurality of data stored in the first cache line is written to the write buffer and a plurality of data is read from DRAM and written to the first cache line, and said first data is written from said write buffer to said DRAM.

8. The CDC as provided in claim 7, wherein said first predesignated conditions include said CPU initiating a read access resulting in a cache miss and said first cache line is a dirty line.

9. In a microprocessor system comprising a CPU, a main memory, a write buffer coupled to said main memory, and a cache memory coupled to said CPU having cache lines associated with addresses in said microprocessor system, where each cache line comprises a plurality of groups of words, a concurrent cache line replacement method comprising the steps of:

(i) initiating a read access of data at a first address;

(ii) determining whether said read access is a cache miss, and further determining whether a particular cache line in said cache memory associated with said first address is a dirty line; and (iii) if said read access results in a cache miss, and said particular cache line is a dirty line then performing the following steps:

(a) initiating writing of a group of a predetermined number of words of the dirty line in said cache memory to said write buffer, where the group of predetermined number of words contains at least one word and is smaller than the cache line;

(b) simultaneously initiating reading words of a new line from said main memory; and (c) following the completion of said writing of the group of predetermined number of words of the dirty line to said write buffer performing the following steps:

(1) providing a group of a predetermined number of words of said new line in response to the reading of the new line from said main memory, where the group of the predetermined number of words of said new line is equal in size to the group of the predetermined number of words of the cache line; and (2) writing the group of the predetermined number of words of said new line into said cache memory and to said CPU;

(iv) upon completion of step iii(c), repeating step (iii)(a) and (iii)(c) until the dirty line is entirely written to the write buffer and the new line is entirely written to the dirty fine; and (v) writing the dirty line from said write buffer to said main memory.

10. The method of claim 9, wherein the group of the predetermined number of words of the dirty line consists of one word.

11. The method of claim 9, wherein the group of the predetermined number of words of the dirty line consists of a d-word.

* * * * *

UNITED STATES PATENT AND TRADEMARK OFFICE
CERTIFICATE OF CORRECTION

| | | |
|---|---|---|
| PATENT NO. | : | 5,479,636 |
| DATED | : | December 26, 1995 |
| INVENTOR(S) | : | Vanka et al. |

It is certified that error appears in the above-identified patent and that said Letters Patent is hereby corrected as shown below:

In column 12 at line 36 delete "fine" and insert --line--

Signed and Sealed this

Nineteenth Day of August, 1997

Attest:

BRUCE LEHMAN

*Attesting Officer* — Commissioner of Patents and Trademarks